United States Patent [19]
West

[11] 3,805,686
[45] Apr. 23, 1974

[54] AIR POLLUTION CONTROL SYSTEM FOR FOOD PROCESSING APPARATUS

[76] Inventor: Clarence W. West, 208 S. LaSalle St., Chicago, Ill. 60604

[22] Filed: Dec. 15, 1972

[21] Appl. No.: 315,386

[52] U.S. Cl............... 99/352, 55/227, 55/385, 99/468, 99/475, 99/480
[51] Int. Cl............................................. A23b 1/04
[58] Field of Search............. 99/467, 468, 473, 352, 99/469, 480, 474, 475, 476, 229; 55/227, 228, 385

[56] References Cited
UNITED STATES PATENTS

| | | |
|---|---|---|
| 2,310,222 | 2/1943 | Deverall.............................. 99/468 |
| 2,312,339 | 3/1943 | Jones................................... 99/331 |
| 2,380,428 | 7/1945 | Gilliam................................. 99/476 |
| 2,832,278 | 4/1958 | Taramik............................... 99/475 |
| 3,199,436 | 8/1965 | Rasmussen et al. ................. 99/331 |

Primary Examiner—Billy J. Wilhite
Attorney, Agent, or Firm—Thomas F. Peterson

[57] ABSTRACT

An air pollution control system for treating contaminated air generated by food processing apparatus. Moist air laden with impurities and odors during food treatment is withdrawn from a processing chamber, cooled to condense moisture and particulate matter out of the air, and returned to the processing chamber, without discharge into the atmosphere. The conditioned air is reheated, absorbing moisture from the food product and again fed into the system.

10 Claims, 1 Drawing Figure

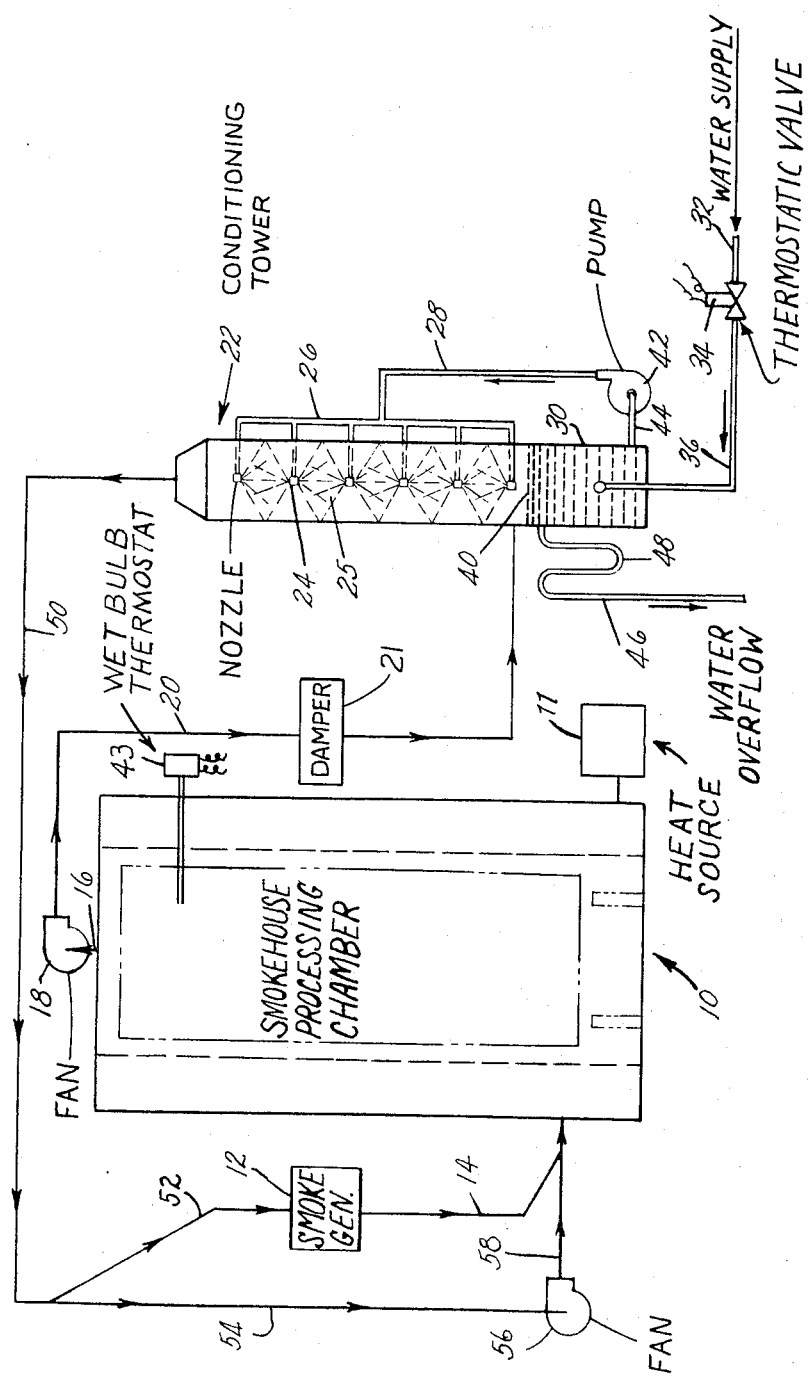

AIR POLLUTION CONTROL SYSTEM FOR FOOD PROCESSING APPARATUS

BACKGROUND OF THE INVENTION

The invention concerns an air pollution control system for processing air emitted from a food treatment chamber in which food products are cooked, and may also be smoked.

Food products, such as ham, bacon, sausage, and the like, are often pumped or infused with a liquid to facilitate cooking and to improve flavor and appearance, as is well known in the art. Some food products, especially meat, fish, and the like, also may be smoked or treated with a smoke derivative, known in the art as "liquid smoke", so that there will be imparted a desirable smokey flavor to the cooked product. The product may be immersed in the liquid smoke, or the liquid smoke may be sprayed onto the product. Alternatively, the food processing chamber can be supplied with a separate source of smoke either from ordinary wood burning or by generating smoke from a smoke derivative product, for direct contact with the food product during a portion of the cooking cycle.

However, whether or not smoking is used during a part of the cooking cycle, the liquid added to the product must be substantially removed and the weight of the food product restored to approximately the original weight before it is considered suitable for consumption. Thus one major problem is efficiently removing the moisture from the food product treated in a processing chamber.

Simple recycling of the moist exhaust air would be ineffective because of the relatively high humidity thereof and the resultant inability of the air to absorb additional moisture from the food product.

Accordingly it has been suggested in the past to treat the air emitted from a food processing chamber by various systems to remove particulate matter therefrom, to discharge the treated air to the atmosphere, and to supply fresh relatively dry air into the processing chamber for absorption of additional moisture from the food product.

There are, however, severe problems attendant the discharge of such air into the atmosphere. The emitted air from the processing chamber not only contains moisture, but often contains excessive particulate matter, grease aerosols, and various tars and other organic substances picked up during the processing cycle. There may also be emitted toxic gases, and odors which may be considered non-toxic but which nevertheless are often considered offensive.

At the present time, federal and local governmental agencies are concerned with environmental protection, and particularly air pollution control, so that the various emissions traditionally associated with food processing chambers and especially food smokehouse operations are, or will soon be, subject to strict regulations.

One method of treating the contaminated air emitted from a food processing chamber in the past has been by direct incineration, which requires the use of a separate source of energy such as natural gas or fuel oil. However such sources of fuel require after-burners or related apparatus, adding considerable costs and even providing for further pollutants from combustible fuel, in effect, exchanging one pollutant for another.

It has also been suggested to utilize wet scrubber devices to remove water soluble and oxidizible contaminant matter from the emitted air, but these devices have proven to be ineffective and inefficient especially against sub-micron smoke particulates. Electrostatic precipator devices also have been suggested, but at an initially very high cost along with the continuous problem of accumulation of grease aerosols and particulate matter requiring considerable maintenance during operation.

Separate boiler incineration may also be used for treating the emitted air from a food processing chamber but this required considerable maintenance of the burner and all of the connecting duct work which may well extend to some distance from the processing chamber, along with the necessity for insuring continuous efficient boiler operation during the cooking cycle to avoid discharging untreated air to the atmosphere.

SUMMARY OF THE INVENTION

The present invention overcomes the foregoing problems in providing an improved air treatment system for food processing apparatus, and particularly for conditioning air from a smokehouse, without the need for excess energy consumption or special incineration apparatus or heat treatment devices, and also without need for providing discharge of foul air of any kind whatsoever into the atmosphere, and further avoiding the need for supplying fresh additional dry air into the system for moisture removal from the food product.

In particular the invention contemplates the use of a closed air treatment system, uncomplicated in design and perfectly suitable for use with various existing food processing locations and smokehouse installations as well as for use with new processing equipment.

The invention provides a unique solution to a serious air pollution problem in that the control of contaminated air is complete and avoids discharge of any kind into the atmosphere. The invention is of essentially simple construction and moreover provides for highly economical and efficient operation. Finally, the food products treated in accordance with the invention have a high degree of uniformity and superior quality.

BRIEF DESCRIPTION OF DRAWING

The accompanying drawing is a schematic illustration of a preferred embodiment of the invention.

DESCRIPTION OF PREFERRED EMBODIMENT

The following detailed description of the invention is intended to convey a clear understanding of the inventive concept but will be understood to be exemplary of other embodiments not specifically illustrated or described but within the scope of the invention as particularly set forth in the accompanying claims.

Referring now to the drawing, there is illustrated a food processing chamber 10, in which food products, such as ham, sausage, and the like, are supported on movable racks or other devices (not shown) and a suitable heat source 11 is coupled to the processing chamber 10 for cooking the food products, in a manner well known in the art. During the cooking cycle, which is dependent upon the selected food product being processed, a smoke generator 12 may be actuated to provide a supply of smoke for delivery by way of a conduit or duct into the smokehouse processing chamber for direct contact with the food product contained therein. The manner of generating the smoke and the duration of introduction of the smoke to the smokehouse chamber is dependent upon the product being treated, and forms no part of the present invention.

Alternatively, the food product may be infused with liquid smoke to provide the desirable smokey flavor during the cooking process and without the need for generating a separate supply of smoke to contact the food product. The manner of imparting the smokey flavor to the food product does not form a part of the present invention.

A preferred manner of imparting a smokey taste to the food product is by spraying a liquid smoke product onto a hot plate to quickly form large quantities of dense smoke which can then be directed to the food product for contact therewith. The concentrated smoke thus produced has been found to be far preferable to traditional wood burning.

Referring again to the drawing, the food product is processed in the chamber 10 for a predetermined cycle which may extend from a period of only a few hours up to about 12 to 14 hours, depending on the selected product. In the illustrated embodiment, a portion of the food cooking cycle includes treatment of the food product by smoke introduced by way of the smoke generator 12. Moist air containing various contaminents is emitted from the smokehouse chamber 10 through a duct 16 and is circulated by means of a booster fan 18 to a duct 20 for subsequent conditioning. A damper 21 may be provided in the duct 20 for modulating the flow of air to be conditioned, as will be described below.

For the purpose of conditioning the contaminated air there is provided a conditioning tower 22, preferably in the form of an upstanding chamber, through which the contaminated air is directed. The tower is provided with a plurality of water spray nozzles 24 extending into the chamber and mounted in a vertical array, preferably with individual control valves (not shown). The nozzles are connected by suitable conduits 26, 28 to a supply of water. A water reservoir 30 is provided in the lower part of the tower 22 and is adapted to supply water to the conduits 26, 28 and thus to the nozzles 24 by means of a suitable circulating pump 42, as will be described below.

A source of fresh water (not shown) is fed through a supply pipe 32 to a conventional control valve 34 which is connected to a suitable thermostatic control (not shown). The thermostatically controlled valve is arranged for regulating the supply of fresh water, which may be at a temperature of about 55°F., for example, through a supply pipe 36 into the reservoir 30, in order to maintain the water in the reservoir at a preferred operating temperature. The water in the reservoir is maintained at a preselected level 40 by means of an overflow device described hereinafter. Water from the reservoir 30 is drawn by the pump 42 through a conduit 44 connected to the reservoir 30, the pump circulating the water through conduits 26, 28 to the spray nozzles 24 within the conditioning tower 22. The cool water is sprayed through the nozzles 24 providing a fine shower, shown by dotted lines 25, and collected in the reservoir 30 located therebelow. The valve 34 is selectively operated to furnish enough fresh water to maintain the water in the reservoir at a preferred operating temperature, which may be from about 80° F. to about 90° F, for example.

The contaminated air in the duct 20 is fed into the tower 22 and passes upwardly through the water tower 25, while the water is free to drain downwardly into the reservoir 30. By selectively operating the pump 42, a given supply of water can be recirculated and replenished as needed to chill the warmer air which passes through the tower to such an extent that a given amount of moisture and at least some of the particulate matter will be removed therefrom.

To this end, the pump 42 is coupled to a suitable thermostatic control such as a wet bulb thermostat 43 which is arranged to be responsive to variations in the humidity or moisture content of the air in the processing chamber 10. Thus, the cooling effect of the water sprayed onto the warm air passing through the tower 22 can be varied and controlled in accordance with predetermined variations in the moisture content or humidity of the air within the processing chamber. When the humidity of the air in the processing chamber exceeds a desirable amount, as measured for example by variations in the wet bulb air temperature, the pump 42 is activated to supply water to the conditioning tower for the purposes of cooling the contaminated air passing through the tower, thus reducing the temperature of that air, and consequently, lowering the humidity and removing some particular matter. The cooking temperatures and moisture content of the air within the processing chamber 10 will be understood to be dependent upon the selected food product being treated. A given amount of a fish product, for example, can be treated so as to emerge from the processing apparatus in a somewhat drier condition than a similar amount of ham, for example, by adjusting the temperature responsive control for the pump 42. Accordingly, the pump 42 can be arranged to operate at any selected humidity level of the air in the chamber.

Connected to the tower 22 is a return duct 50 for recycling the conditioned air back to the smokehouse processing chamber 10. By use of a suitable damper (not shown) the air can be selectively directed back to the smoke generator 12 by a branch duct 52 connected to return duct 50, while at other times all or a portion of the conditioned air is conducted from duct 50 through another branch duct 54 to a booster fan 56 and a supply duct 58 which is connected to the processing chamber 10.

It will be appreciated that the warmer air passing through the tower 22 will raise the temperature of the water used for cooling, and thus it will be necessary for the water supply control valve 34 to be opened at certain times to admit fresh water, for example at about 55° F., into the cooling system to maintain the reservoir water temperature within the preferred range of about 80° F. to 90° F.

A water discharge pipe 46 is connected to the reservoir 30 for overflow, particularly where fresh, cooler water is being supplied to the reservoir. The water level 40 can be controlled by a suitable valve (not shown), or may drop to the level of the discharge pipe 46. Preferably the discharge pipe is provided with a water seal 48, which may take the form of conventional trap having a U-shaped configuration, to prevent discharge of gases from the tower.

The particulate matter which is removed from the air passing through the tower is collected in the water reservoir 30 and safely treated and disposed of by known methods such as by chemical treatment and/or holding tanks, and the like.

When pump 42 is operating, the warm air passing through the conditioning tower 22 is cooled to a temperature below the dew point thereof by direct contact with the fine sprays 25 of cool water, whereby moisture is condensed or "wrung" out of the air. The air is therefore returned at a lower temperature and with a substantially reduced capacity for holding moisture. Upon being recycled into the processing chamber, the relatively dry air is reheated and again becomes capable of absorbing additional moisture from the food product contained in the chamber. Thus the same air can be recycled over and over again, and a supply of dry outside air is unnecessary.

It will also be understood that there is no need to remove all of the particulate matter or smoke from the recycled air since it is contained in a closed system without discharge to the atmosphere. Thus since the returned air may contain smoke there is less need for generating and supplying additional new smoke into the chamber during the smoking portion of the cooking cycle. By reconditioning the air over and over, after the smoke generator is shut off, the smoke content of the air will progressively decrease until substantially no particulate matter will remain in the air at the end of the cooking cycle.

In treating bacon a typical cooking and smoking cycle would be about 7 hours total time elasped, whereas for treating ham, the complete cycle could extend up to about 10 or 12 hours. However, whether treating bacon, ham, or other food products, the smoking portion of the processing cycle would be intermittent, and of relatively short duration, for example about 1 to 1½ hours. When the smoking portion of the cycle is completed, and the smoke generator is shut off, the air continues to be recycled and conditioned during at least part of the remainder of the cooking cycle. The food product thus continues to absorb smoke from the returning dry air, while additional moisture is removed from the food product, so that substantially no smoke particles or residual cooking products remain in the air at the end of the processing cycle. The smokehouse chamber then can be safely opened to remove the treated food product at the end of the processing cycle without any danger of exhausting fouled air to the environment.

In one example of the invention, 600 lbs. of hams were "pumped" with about 60 lbs. or about 10 percent by weight of moisture known in the art as the "pickle", solution of brine, brown sugar and other additives. The hams thus treated were cooked and smoked in a smokehouse and the moisture was removed from the hams in accordance with the invention. To indicate the efficiency of moisture removal from the air during the cooking cycle, the average dry bulb air temperature in the smokehouse was maintained at about 179°F. while the average wet bulb temperature was about 153°F., the humidity in the air being about 48 percent. This was equivalent to a moisture content of about 0.225 lbs. of water per pound of air. The moist contaminated air was withdrawn from the smokehouse through the duct 20, directed into the dehumidifying tower 22, and subjected to the cooling water spray 25 provided by the nozzles 24. The air was thereby chilled to below its dew point and moisture was condensed therefrom. The conditioned air directed back to the processing chamber was found to have an average dry bulb temperature of 102°F., while the average wet bulb temperature was 101°F., or nearly 100 percent humidity, but containing only about 0.044 lbs. of moisture per pound of air. Comparing the moisture content of the air within the processing chamber before conditioning and the moisture content of the air returning to the processing chamber, it was found that a total of about 0.181 lbs. of water per pound of air had been removed.

The cooler and relatively drier air was again heated upon re-entering the processing chamber, and due to its lower moisture content such air was capable of absorbing substantial additional moisture driven off by the food product being cooked therein. The reheated air having additional moisture added to it, or re-humidified, and then withdrawn into the treatment system for again cooling and condensing moisture therefrom and recycling. This process was continued until the air recycled in the system was substantially smoke free. By the end of the cooking cycle the processing chamber was safely opened to remove the cooked and smoked hams, without undesirable discharge of any consequence into the environment.

In another example of the invention a smaller smokehouse was utilized to process 40 porkbellies having an average weight of about 9.8 lbs. in a test of about 5½ hours duration. The 392 lbs. of meat after being pumped with liquid additives weighed about 436 lbs. The average pumped weight of each porkbelly (after being infused with added moisture) thus was about 10.9 lbs.

The average weight of the bellies after completion of the cooking cycle was about 10.1 lbs., or a direct yield over the initial weight of about 103.6 percent. Thus, about an average of about 0.8 lbs. of the added moisture was successfully removed while cooking and smoking the bellies so that an average of about 0.3 lbs. of the moisture remained, an acceptable level. Subsequent chilling of the cooked bellies, as is customary in the art, reduced the average smoked weight from about 10.1 lbs. to a final chilled weight of about 9.8 lbs.

In this example it was found that the volume of water used was rather low, considering the amount of moisture removed from the pork bellies, i.e. about 44 lbs. moisture added and about 30 lbs. removed. Specifically, about 150 gallons of water were used during the 5½ hour cooking cycle or about one-half gpm (gallons per minute).

As mentioned above, a control damper 21 may be provided in the duct 20 for variable control or modulation of air flow withdrawn from the processing chamber. Operation of the control damper 21 can be manually or automatically varied in accordance with moisture content or humidity of the air in the processing chamber by connecting the damper 21 to the wet bulb thermostat 43. Thus to avoid rapid dehumidification of the air removed from the processing chamber it will be desirable in some instances to modulate the air flow or to shut off the air flow all together, at least for a period of time, to allow for humidity to build up within the processing chamber. This is especially advantageous at the beginning of the cycle to facilitate control of the food product which otherwise might become overly dry and unsuitable. Of course it is well known in the art that some food products are intentionally dried out more than others during the selected cooking cycle. In that case the damper would remain open for longer periods during the cycle.

The invention also contemplates the injection of steam into the processing chamber at certain times in the cooking cycle to add humidity to the air therein. This may be particularly desirable near the beginning of the cooking cycle where saturation of the food product is important for beginning the cooking process. The injection of steam into the processing cycle is well known and can be combined with operation of control damper 21 to allow humidity to build up in the processing chamber for proper cooking conditions. Again it will be mentioned that the variations in humidity can be controlled for short periods of time at different points in the cooking cycle as desired and as necessary depending upon the selected product being treated.

Advantageously, steam also may be injected into the processing chamber for final purging of smoke and particulate matter from the air near the end of the cooking cycle. While the recycled air at the end of the cooking cycle will generally be free of smoke and particulate matter, the remaining particles can be purged from the system by rapidly injecting steam for a short duration. The conditioning tower condenses the steam thus introduced into the system so that the remaining particulate matter is essentially flushed out of the air into the water for subsequent treatment. As noted above, the water can be treated by providing for holding tanks and/or chlorine treatment, or the like, as is well known in the art.

These refinements have been found to add to the ability to carefully control the cooking cycle for a given food product regardless of outside conditions. Thus an advantage of the invention is the saving of energy needed to heat the processing chamber, because the recycled air entering the chamber is warmer than the outside air which generally will be variable in temperature and humidity conditions. By controlling humidity in the system and moisture absorption from the food product during varying cooking conditions, the resulting food product will be of consistently high quality as to aroma, flavor and appearance.

In summary the invention provides for recirculation of smoke laden air in a closed loop system by cooling and removing moisture from the air, enabling the recycled air to absorb additional moisture and to effectively remove from the food product substantially all of the moisture that had been added to the food product before processing. At the same time the invention avoids discharge of smoke, particulate matter, gaseous products or noxious odors to the atmosphere. Furthermore, the invention avoids the need for providing supplementary burning or incineration of the smoke laden air, and it is unnecessary to provide for the additional supply of fresh dry air into the system for removing moisture from the treated foods.

Accordingly, it will be apparent that the present invention solves a critical air pollution problem in the food processing art with a system that is simple, economical and complete.

I claim:

1. In a food processing apparatus having a cooking chamber and means providing a source of heat for cooking a food product contained in said chamber, a closed air treatment system which is independent of outside air temperature and humidity conditions, comprising means for withdrawing air from said chamber during the cooking of said food product, means for cooling the withdrawn air to a temperature below the dew point thereof to condense moisture therefrom and to thereby lower the humidity thereof, and means for recycling said cooled and conditioned air directly to said processing chamber for reheating therein.

2. An apparatus as defined in claim 1, wherein said air cooling means comprises shower means for subjecting said withdrawn air to a fine spray of cool water, means for collecting water sprayed by said shower means, and means for recirculating said water to said shower means.

3. An apparatus as defined in claim 1, wherein said cooling means includes a conditioning tower having an air inlet, an air outlet, nozzle means arranged in said tower between said inlet and outlet, and pump means for supplying water to said nozzle means.

4. An apparatus as defined in claim 3, including reservoir means for collecting water emitted by said nozzle means, means connecting said reservoir means to said pump means, means supplying fresh water to said reservoir means, and control valve means for selective supply of fresh water to said reservoir means in response to predetermined water temperature conditions in said reservoir means.

5. An apparatus as defined in claim 3, including control means coupled to said pump means and operable in response to predetermined variations in wet bulb air temperature in said processing chamber for selectively actuating said pump means.

6. An enclosed system for cooking and removing moisture from a food product which is high in moisture content, which system is independent of outside air temperature and humidity conditions, comprising a processing chamber adapted to receive a quantity of the food product to be treated, means for cooking said food product and driving moisture therefrom into the air within the chamber, means for discharging moist exhaust air from the processing chamber, conditioning means connected to said air discharge means for cooling said exhaust air and condensing moisture therefrom, means connected to said air cooling means for recycling said conditioned air into said processing chamber, whereby said conditioned air is reheated for absorbing additional moisture from said food product.

7. A system as defined in claim 6, wherein said air discharge means includes an airflow control means connected for regulating the flow of air.

8. In a food cooking apparatus, wherein a pretreated moist food product is heated in a processing chamber having a source of heat therefor, the improvement comprising a closed system for conditioning and recycling air discharged from the processing chamber, which system is independent of outside air temperature and humidity conditions, said system having means for removing contaminated air from said chamber, means for conditioning said air to condense moisture therefrom, means for returning the conditioned air to said processing chamber, and control means for modulating the flow of air through said system in accordance with preselected variations in the humidity of air within said processing chamber.

9. An enclosed food cooking apparatus, comprising a food processing chamber adapted to receive a quantity of food product infused with liquid additives, means for supplying heat to cook said food product driving moisture therefrom into the air contained within said chamber, and a closed air treatment system which is independent of outside air temperature and humidity conditions, including adjustable means connected to said chamber for selectively withdrawing moist air therefrom, means for chilling the withdrawn air to reduce the capacity of the air for holding moisture, means for returning the chilled air to said processing chamber for reheating the air to absorb additional moisture driven from said food product, and control means for selective operation of said treatment system until a substantial portion of the infused liquid has been removed from the food product.

10. An enclosed food cooking system which is independent of ambient air temperature and humidity conditions, comprising a processing chamber in which food products are cooked and smoked, said chamber having an inlet and an outlet, a source of heat for said chamber, means coupled to said chamber outlet for treating gases emitted therefrom including a water shower condenser for cooling said gases to a temperature below the dew point thereof, means connecting said condenser to said processing chamber for returning said treated gases thereto, a closed smoke generator interconnected within said system for direct supply of smoke into said processing chamber for at least a portion of the cooking cycle, and means for circulating a portion of the gases in said closed system through said smoke generator.

* * * * *

UNITED STATES PATENT OFFICE
CERTIFICATE OF CORRECTION

Patent No. 3,805,686         Dated April 23, 1974

Inventor(s) Clarence W. West

It is certified that error appears in the above-identified patent and that said Letters Patent are hereby corrected as shown below:

Column 6, line 36, cancel the word "about" (first occurrence only).

Column 8, line 49, at the end of claim 7 after the words "flow of air" insert --to said conditioning means--.

Signed and sealed this 29th day of October 1974.

(SEAL)
Attest:

McCOY M. GIBSON JR.
Attesting Officer

C. MARSHALL DANN
Commissioner of Patents